(12) United States Patent
Heslin et al.

(10) Patent No.: US 6,705,247 B1
(45) Date of Patent: Mar. 16, 2004

(54) REMOTE CONTROL AND DATA LOGGING

(75) Inventors: Michael Brett Heslin, Auckland (NZ); David James Howell, Auckland (NZ)

(73) Assignee: Tru-Test Limited, Auckland (NZ)

( * ) Notice: Subject to any disclaimer, the term of this patent is extended or adjusted under 35 U.S.C. 154(b) by 0 days.

(21) Appl. No.: 09/647,820

(22) PCT Filed: Apr. 1, 1999

(86) PCT No.: PCT/NZ99/00042

§ 371 (c)(1),
(2), (4) Date: Oct. 2, 2000

(87) PCT Pub. No.: WO99/51083

PCT Pub. Date: Oct. 14, 1999

(30) Foreign Application Priority Data

Apr. 2, 1998 (NZ) ................................. 330112

(51) Int. Cl.$^7$ .................................................. A01J 3/00
(52) U.S. Cl. .................................................. 119/14.02
(58) Field of Search .................... 119/14.01, 14.02, 119/14.08, 14.03

(56) References Cited

U.S. PATENT DOCUMENTS

| | | | | |
|---|---|---|---|---|
| 5,355,833 A | * | 10/1994 | Legrain | 119/51.02 |
| 5,743,209 A | * | 4/1998 | Bazin et al. | 119/14.08 |
| 5,771,837 A | * | 6/1998 | van der Lely | 119/14.02 |
| 5,873,323 A | * | 2/1999 | van den Berg et al. | 119/14.02 |

FOREIGN PATENT DOCUMENTS

| | | | |
|---|---|---|---|
| EP | 0657098 A1 | 12/1994 | A01K/11/00 |
| WO | 97/05768 | 2/1997 | A01J/9/00 |
| WO | 96/00401 | 7/1998 | A01J/5/017 |

* cited by examiner

*Primary Examiner*—Thomas Price
(74) *Attorney, Agent, or Firm*—Blakely, Sokoloff, Taylor & Zafman

(57) ABSTRACT

A method for testing of animals being milked, the system including a plurality of milk meters. A portable remote control device is provided to input data to the milk meters, receive and store data from the milk meters and display at least selected data. The remote control device is pre-loaded with animal related data and information relative to animals being milked is transmitted from the remote control device to the milk meters. Transmission of information from the milk meter as a consequence of an animal being milked is transmitted to the remote control device to enable updating of a record relevant to the animal being or having been milked. The remote control device thus provides a single interface with all milk meters for the inputting and receiving of data.

8 Claims, 1 Drawing Sheet

| ▼ | 0 | ON/OFF |
|---|---|---|
| MISSED 1 | LOST 2 | IN SEASON 3 |
| HELD MILK 4 | FINISHED 5 | WASH 6 |
| WITH CALF 7 | SICK 8 | METER OFF 9 |
| | STATE | ANIMAL |

| ▼ | 0 | ON/OFF |
|---|---|---|
| MISSED 1 | LOST 2 | IN SEASON 3 |
| HELD MILK 4 | FINISHED 5 | WASH 6 |
| WITH CALF 7 | SICK 8 | METER OFF 9 |
|  | STATE | ANIMAL |

FIGURE

REMOTE CONTROL AND DATA LOGGING

BACKGROUND OF THE INVENTION

This invention relates to a method and means for recording data resulting from individual testing of animals being milked.

On-farm testing of animals being milked is a common practice. This involves taking a yield measurement representative sample of milk produced by each animal. The data and samples are identified in relation to the animals from which they are taken and then taken off farm for analysis and data processing.

The resultant information can be used for a variety of purposes including livestock or herd improvement. The methodology used for such testing is, however, open to improvement. For example, there is a desire to improve the reliability of testing procedure and test results as well as automatic collection of data and to improve the convenience of the procedure.

SUMMARY OF THE INVENTION

There is thus an opportunity for an improved method and means of recording data arising from the testing of animals being milked to enable subsequent off-farm analysis and data processing. It is thus an object of the present invention to provide such an improved method and means.

BRIEF DESCRIPTION OF THE DRAWINGS

The FIGURE shows a layout of a keypad of a remote control according to the invention.

Broadly, in one aspect of the invention there is provided a method of recording data relevant to the milk production of an animal, the method comprising loading animal related data into a remote control device, using a plurality of recording means to record and store information relative to animals being milked and using transmission means to transfer at least part of said information to the remote control device to enable updating of a record in the remote control device relevant to the animals being or having been milked.

According to a second broad aspect of the invention there is provided a data recording means for the recording of data relevant to the milk production of a plurality of animals, the data recording means comprising a remote control device constructed and arranged to accept and store animal related data, recording means adapted to be associated with each of a plurality of animal milking means, transmission means to facilitate at least transfer of information related to an animal being or having been milked to the remote control device and means which can use the information to update a record in the remote control device relevant to the animal to which the information relates.

According to a third broad aspect of the invention there is provided a data recording means for the recording of data relevant to the status of the individual meters and remote controls, the data recording means comprising the same remote control constructed and arranged to accept and store meter-status related data, recording means adapted to be associated with each of a plurality of meters, transmission means to facilitate at least transfer of information related to a meter being or having been used to the remote control and means which can use the information to update a record in the remote control device relevant to the animal to which the information relates.

DETAILED DESCRIPTION OF PREFERRED EMBODIMENTS OF THE INVENTION

The present invention is based on a remote control device via which data can be collected and stored to then be taken off-farm for up-load to other analysis and data processing facilities. A remote control is used on-farm in conjunction with a plurality of milk meters, a single milk meter being provided for each milking station or site whether it be part of a herringbone or rotary platform shed or other shed layout. The remote control is in the preferred form used on-farm as the primary means of entering and transmitting operating and control data and receiving (preferably also displaying) data from any selected milk meter. More than one remote control can be used in a milking installation.

The remote control, at the conclusion of a milking session, is the one element in the data recording system that has a complete record of all of the information (data) from all of the animals that have been milked in that particular milking session. This complete record is updated from time to time within the duration of an animals milking to reflect changes in yield and flow and status. Preferably the remote control is able to display information from any one milk meter at any time, therefore it can display current yield (and preferably current flow rate) from any selected animal being milked.

In particular, the remote control is the removable element that has a complete match of the identification of an animal, the yield of an identified animal, and the sample vial number for the identified animal in each milking session. The remote control is also the only element in the data recording system that has a complete record of the identity and the status of all meters with which it has communicated, and its own status.

The remote control is in use pre-loaded with farm-specific data prior to being put into use in a test session. The pre-loaded data can, for example, include:

(i) herd/mob identification code;

(ii) animals recorded as being present in the herd, or animals recorded as being milked;

(iii) date and time (real time clock data to be up-loaded to meters);

(iv) vacuum level;

(v) milking period: (e.g. 8, 14, 24 hour);

(vi) a command to automatically collect data from any meter that was present on the farm for a particular milking session.

In general, the remote control will be pre-loaded with a list of those animals that are either: shown as being in the herd; or shown as being milked. The remote control can then check for valid animal identifications, and duplicate animals. The actual list used affects how the operator of the system is forced to consider anomalies:

(i) If the list comprises animals recorded as being milked, then this will (typically) be shorter than the complete herd list. This will result in animals which have just come into milk, but have not been recorded as such, being anomalous and requiring operator attention during the milking session while the operator is extremely busy.

(ii) If the list comprises animals recorded as being in the herd, then this will (typically) be longer than the being milked list. This will result in animals which have just come into milk, but which have not been recorded as such, not being anomalous and not requiring operator attention during the milking while the operator is extremely busy. There will, however, be a requirement to explain all of the missing animals at the end of the milking session.

(iii) The operation of the remote control is essentially independent of the nature of the animals list, the choice being left to the operator. This is basically a trade-off between multiple single-animal corrections during the milking session and a single multi-animal correction at the end of the milking session.

In those cases where an animal database is not pre-loaded into the remote control, then the remote control will automatically generate a default database using the animal identifications as they are entered during the first milking sessions (am or pm) of a test session. While no check can be made for valid animal identifications in this first milking session, the remote control will continue to check for duplicate entries. The second milking session will use the database generated from the first milking session as the check list.

The remote control will physically be of a size and weight that it can be readily transportable. For example, it is preferred that the remote control will not exceed 0.5kg complete and will not exceed a volume defined by 180mm (length), 100 mm (width) and 30mm (depth). To be transportable, the remote control can operate from a permanently installed rechargeable battery. Preferably, the remote control includes a battery charging sequence which enables automatic charging of the internal battery when connected to an external charging circuit.

The remote control is provided with a keypad and a liquid crystal display of, say, two lines each of 16 characters.

In the preferred form, the communication medium between the milk meters and a remote control is a suitable radio frequency (RF) link capable of successfully transmitting over a range of approximately up to 6 meters in a typical milking shed environment. In the preferred form any non milk meter communication will be established by a suitable contact-based RS232 link so as to, for example, provide for down-loading of test session data and the up-loading of herd-test data.

The remote control device maintains its own master database of all animals which have been milked through all meters present at any particular milking (test) session and has sufficient non-volatile storage to allow the retention of all data on milked animals for a period of at least one testing session (which may include one or more milking sessions). For example, minimum storage capability can be 32 Bytes per animal, 200 animals per milking, 2 milkings and 35 Bytes of pre-loaded herd data for at least 1500 animals. The remote control preferably has a communication rate of at least 9600 bits per second. In addition to the animal-specific records additional records, each of 32 Bytes may be added to the database in order to identify: logical grouping of animals into milking sessions (say, am and pm); supplementary animal-specific data including, e.g. milking profiles, and/or milk conductivity; farm-test regeneration data.

The remote control is programmed so as to check each animal identification for validity before transmission to a milk meter. Thus, for example, if an animal is not shown in the programmed database of animals as being in milk or in the herd, then the operator will need to confirm the animal's identification. Additionally, if an animals identification is entered twice within the same milking session the remote control will require confirmation that the currently entered animal number is correct before transmission to the meter can take place. If correct then the earlier record with the same animal number may be edited to another animal number or the animal number may be left as a duplicate or unknown.

It is preferred that a powered up remote control be in the vicinity of every meter while the latter is being turned on. If a meter cannot establish communications with any remote control in its power up sequence then the meter will immediately turn off again, however, another implementation might allow meters to power up and look for another powered up meter (preferably the most recent) and register through that meter.

To achieve the required function's integrity and operation of the remote control, the remote control preferably has various command interpreting software procedures. These may include use of operating procedures where this is appropriate, and also specially written procedures.

The remote control is able to automatically retrieve all testing data collected during a particular milking session or sessions on a particular farm on a particular date from any meter that was on the farm on that date. In order to allow this to happen, the remote control creates a list of all meters that are registered with it during a milking session and passes this list to all of the meters; thus the remote control and all of the meters know the identities (serial numbers) of all of the meters and the remote control(s) in use on-farm for every milking session.

Following the completion of a testing session, the remote control is returned to a central site to allow the extraction of the data. The meters, however, may severally continue on to different farms for further testing sessions. In the event of one or more remote controls being lost or damaged, the specific farms test data on specific days, which as a result have been lost, may be regenerated by other remote controls through the process of:

(i) programming all remote controls to look for any meters that were on the specific farms on the specific days;

(ii) interrogating each meter when it registers with a particular remote control to see if it has any of the wanted data;

(iii) extracting the wanted data from a meter and also extracting the list of the other meters that were on-farms during the periods of interest;

(iv) continuing the process with all remote controls on all other farms with all other meters of interest;

(v) returning the collected data to a central site for processing, and for checking to see whether all meters have been found and all data retrieved.

Alternatively, data from specific meters can be sought or data from meters that were under the control of specific remote controls can be sought.

In some large milking sheds (particularly linear rather than circular) there may be a requirement for more than one remote control. In these circumstances it may be beneficial to split the length of the shed into two or more contiguous sections with each being controlled by its own remote control. In order for this option to be used the standard operating procedure needs to be modified as follows:

(i) the length of each section needs to be determined in advance and a sufficient number of remote controls provided to meet the requirement;

(ii) the remote control for the first section needs to be turned on and used to register each meter in the first section;

(iii) during the power-up sequence a meter first broadcasts a message looking for a response from any remote control in the vicinity, a remote control will respond with a message that includes its serial number, thereafter in this milking session this meter will communicate directly with this remote control by including the address of the remote control in all messages, as part of the communications the remote control will pass each meter its position in the shed and in the current section;

(iv) when all of the meters in the first section have been powered up another remote control can replace the first one, and the procedure continued with the meters of the next section registering with the second remote control;

(v) because each meter can continuously monitor transmissions once it has powered up, and because each powered up meter has identified its position in the shed and the section, meters know when they are at a boundary between sections;

(vi) either meter at a boundary between sections can request complete section data from its remote control and because it can know the serial number of the meter on the other side of the section boundary it can directly transmit data across the boundary, thereby ensuring the ongoing checking of the test database can continue;

(vii) given the infrequent nature of communications and the short messages that are passed, communication collisions between remote controls and meters will be handled with automated checking procedures which will request re-sends of the affected data;

(viii) at the end of the milking session the data might be and remain split between the remote controls, but each remote control will in any case have a record of all animals that were milked;

Provided this procedure is followed the registration and control sequence will be the same to, and require no further effort on the part of, any operator.

In another embodiment all meters might continuously exchange data with one another, in a serial fashion along (or around) the milking shed by using their unique and known serial numbers as addresses. This option would have greater information transfer flexibility, but would necessarily incur a higher drain on the meters batteries and in some cases possibly reduce the operating life between charges to an unacceptable degree.

In actual operation on farms with very large herds, or with long milking times, one or some of the remote controls may run out of memory in which to store data or run out of battery life. In these circumstances, the affected remote control will have the option of automatically transferring control to another remote control. In the transfer procedure:

(i) the first remote control will detect that it is about to run out of memory or battery;

(ii) the first remote control will notify every meter that it is controlling that it is about to fail and to be ready to register with and be controlled by another remote control;

(iii) the first remote control will pass to each meter all of the information that the second remote control will need for the rest of the milking session;

(iv) the first remote control will notify the operator to obtain a second remote control, turn it on, and keep it on their person;

(v) once every meter has been advised that a new remote control is about to be used, with every successive communication each meter will broadcast a registration sequence to which a second remote can respond with an interim registration, once each meter has achieved communication with a second remote control then its broadcasting will cease, each meter even after this sequence will still continue to communicate with the first remote control until it is advised to switch to the second remote control;

(vi) once all meters have achieved an interim registration with a second remote control and have notified the first remote control of these states then the first remote control will advise all meters that they may begin communication with the second remote control (of known serial number) and once they have started this communication not communicate again with the first remote control;

(vii) once the first remote control has advised all meters that they may communicate with the second remote control it will display a message to the operator that it is about to turn off, advise the operator to start using the second remote control and refuse to process any further input through its keypad;

(viii) the operator will use the second remote control from this point.

In actual operation on farms there is a possibility of a meter running out of battery capacity or failing for a variety of electrical or mechanical reasons. In such circumstances the operator will have the option of replacing a failed meter with a spare should a spare be available. Apart from the necessary operations of removing the failed meter from the milking plant, and the installation of the replacement meter, this process will be completely automatic. In the replacement procedure:

(i) if the failing meter is able to detect that it is failing and it is able to communicate with the remote control it will pass this information to the remote control, if the meter is furthermore able to infer the failure mechanism it will also pass this information to the remote control;

(ii) if the failing meter is not aware of its failing, or if the meter cannot communicate with the remote control, or if the meter turns off then it will be the responsibility of the operator to realise that the meter has failed for some unknown reason;

(iii) once the operator is aware that a meter has failed it will be his/her responsibility to determine the cause of action, e.g. the operator might decide to not use the milking position of the failed meter or replace the meter with a spare;

(iv) once a meter has been removed from the milking plant and a replacement put in its place, this replacement should be turned on in the normal manner (i.e. as previously described with the remote control in the vicinity);

(v) the remote control will continue to communicate with the replacement meter essentially as if the meter had been in operation for the entire milking session, (in some implementations the remote control might automatically load to the meter a complete database of all of the milking session information that has collected prior to the meter replacement, in another implementation the remote control might infer which meter has been replaced and automatically load to the meter the information that had been collected by the failed meter);

(vi) when finishing the milking session, in one implementation the remote control may not require that all meters be accounted for before the several end actions can proceed, in another implementation the remote control might automatically infer that the failed and replaced meter does not have to be accounted for in the end process.

In some (few in New Zealand) cases dairy herds are so large that milking sessions may separately last for many, say, 5–10 hours. In circumstances like these it is possible that a single remote control will not have sufficient battery life to allow it to complete two (or more) milking sessions.

Furthermore, it is possible that an animal database has not been pre-loaded into the remote control. In those rare cases where a separate remote control is used for the two (or more) milking sessions, and neither (or no) remote control has been pre-loaded with an animal database then it will be possible to directly transfer the database automatically generated during the first milking session to the second remote control over the normal RF link.

The milk meter to be used in conjunction with the remote control will have in the preferred form two function-control inputs and three status-display outputs.

The meter will record milk yield and will automatically dispense a representative constant volume sample or a representative sample whose volume is proportional to yield within a prescribed time (e.g.15 seconds) of the end of milking input from the operator. The remote control will automatically record the data that is transmitted by a meter.

The milk meter will preferably be constructed and operable to:

(a) measure milk yield and infer milk flow rate, (b) communicate with a remote control over a suitable RF link, (c) control the communication of commands, status and data between itself and a remote control, (d) using an in-built bar-code reader confirm that a new uniquely identifiable vial has been attached to the sample port, (e) dispense a representative, fixed volume sample into a sample vial that has a valid identification at the end of an identified animal's milking, (f) be powered from its own internal re-chargeable battery such that it can be moved directly from farm to farm with a total operating life of at least 30 hours, (g) control its own recharging from a suitably configured external supply, (h) have no direct means of accepting data from, or displaying data to an operator, (i) maintain a database of all animals which have been milked through it in any particular milking session and meter status, and the serial number of the remote control(s) and a list of the serial numbers of all meters in every milking session, (j) have sufficient non-volatile storage as to allow the retention of all data on milked animals for a period of a number of milking sessions, (k) update, with any and all information changes, the master database in a remote control as required, and transparently to the operator, (l) have a communication rate of at least 9600 bits per second, (m) record the sample vial number against the entered animal identification immediately before a sample is dispensed.

The milk meter thus has no means of displaying or inputting, animal identification, animal yield, (so-far or total) current milk flow rate, animal milking rate (so-far or total), vial or calendar information. The information from the meter, however, is transmitted upon request to the remote control.

According to the preferred form the two control inputs of the meter are:

(i) A meter selection key—activation of this input causes the milk meter to initiate communications between itself and the remote controls, (the remote control will only physically initiate communication exchange in very specific—mainly manufacture and maintenance—circumstances). In every communication exchange:

(a) communication will be by way of conversations within one of which there is an exchange of a series of messages between a meter and a remote control;

(b) within each message each data nibble is immediately followed by its own complement in order to balance the dc level of the signal stream;

(c) each message will include a preamble comprising four balance characters (to generate the correct mean dc level for the RF detector threshold), one sync character, and a start character chosen to balance the sync character;

(d) each message has a message body which follows the message preamble, a message body comprises:
TO—a destination address which is the serial number of the destination device, with the top bit set if it is a meter and clear if it is a remote control, there is always a destination address even in a broadcast message:
FROM—a source address which is the serial number of the destination device, with the top bit set if it is a meter and clear if it is a remote control;
MESSAGE ID—one Byte comprising conversation number and response number;
OPTIONAL DATA—one Byte of type identifier and n Bytes of data for that type;
16-BIT CRC—CRC of all characters in the message body;

(e) each message includes a stop character which cannot appear in the data;

(f) all messages containing data will solicit a response from the receiving device, if no response is received within a time-out time the message will be re-sent up to a maximum number of times;

(g) a message containing no data is an ACK;

(h) a device may continue a conversation after an ACK, however it will not respond with an ACK to an ACK;

(i) on power up a meter will broadcast with a special destination address;

(j) although most conversations will be initiated by a meter, a remote control can initiate conversations through the use of the Tru-Test Limited Serial Communications Protocol, a previous conversation initiated by a meter needs to leave the meter in a suitable state (receiver turned on) for this process to work, this feature is most useful in manufacture and maintenance of meter.

Meter Power On

Specific actions occur when the meter is first turned on:

(a) Whilst the operator has in his/her possession a powered-up remote control, he/she shall proceed sequentially down (or around) the installed meters, from the lowest milking position number to the highest.

(b) At each position the operator will stop, activate either the Select Meter or the End of Milking input on the meter (to power up the meter) and wait until the remote control indicates that he/she may proceed to the next position. If the meter is powered up without a remote control being in the immediate vicinity, then the meter will immediately power down again.

(c) During this time the meter will register with the remote control. Whilst continuously powered-up, hereafter the meter only accepts communications with this remote control until such time as it is registered with a new remote control (in the event of remote control failure, for example).

(d) The meter will send its start status to the remote control. Should this battery state suggest a problem or potential problem (e.g. insufficient battery, failed meter function) then the remote control passes this information to the operator and logs this information to an audit file.

(e) The remote control can infer the meter layout in the milking shed from the information sent to it during this process (clearly the operator has to follow the procedure for this to happen). The remote control can use this information and data from each meter to tell the operator the position and row number for a current animal, and for a previous animal. This can be of some assistance when editing records of earlier animals.

(f) The meter will activate its sampling system to ensure that any liquid left over from a previous wash has been expelled (this assumes that the meter is being operated in accordance with the preferred milking sequence).

Database Update

Upon completion of the transmissions, the meter updates its database (i.e. any animal that has been, or is about to be, milked). If the transmissions are completed satisfactorily, the data is available for storage in the database along with other relevant data generated by the meter (e.g. milk yield, vial number). If the transmissions are not completed satisfactorily, the meter stores the incomplete exchange in a specially flagged record in its database.

Upon completion of the transmissions, the remote control updates its database (i.e. any animal that has been, or is about to be, milked). If the transmissions are completed satisfactorily, the data is available for storage in the database and are also to be displayed. If the transmissions are not completed satisfactorily, the remote control stores the incomplete exchange in a specially flagged record in its database.

Having a Select Meter function is seen as providing three benefits:

(a) The remote control can transmit information over a broader communication "beam". Aiming of the remote control then becomes far less critical, since more than one milk meter can actually receive the information but only that one which has the Select Meter input activated will physically do so. This feature eliminates difficulties that could arise when two (or more) milk meters are close to one another, for example, in some rotary milking installations. Having a Select Meter input means that the communication of data to and from the remote control can be over an omni-directional channel in which case the remote control does not have to be aimed at the meter. For large or rotary installations in which more than one remote control might be required, an omni-directional communication channel (with the necessary access control protocols) might allow the remote controls to "invisibly" swap and reconcile data (for example, to detect repeated animal numbers).

(b) The operator has a physical connection to the meter, with which he or she actually wants to exchange information. This should reduce errors arising from accidentally aiming the remote control at the wrong meter.

(c) Since the communication protocol in general requires a meter to initiate all communication with the remote control, an extension of the procedure to enable direct meter to meter communication would in some implementations facilitate more convenient communication between a remote control and any one of the meters.

(ii) End of Milking—activation of this input causes the milk meter to:

(a) Dispense a representative milk sample provided the conditions listed below are met.

(b) Calculate:
 A final yield.
 An average flow rate.
 A milking time.

(c) Update its internal database.

(d) Initiate communications between itself and the remote control:
 Include its unique electronic serial number in all transmissions.
 Send all status and (subsequently) data to the remote control Activation of the End of Milking input results in a representative 15 mL (or some other volume in the range 15 mL to 50 mL or a sample that is proportional to milk yield) sample for off-farm analysis being dispensed into a vial, provided that:

(a) the milk meter has been correctly powered up and initialised;

(b) the milk meter has not lost the correct time or date;

(c) the milk meter has successfully received a valid animal identification;

(d) the milk meter has had a sample vial with a valid identification attached;

(e) proper signal activity is seen at the measurement probes of the meter during the sample.

Automatic Meter Power Down

If milk flow should stop and there is no input from an operator for, say, 15 minutes and should the current animal have been identified: the final yield as calculated will be stored to the meter's database with an appropriate status flag attachment. Should a sample vial with a valid identification be attached to the meter, then a sample will be dispensed and the sample data stored to the meter's database with an appropriate status flag attachment. If no sample vial with a valid identification is attached to the meter, then the meter will not drain the measurement chamber and an appropriate status flag will be stored to the meter's database. The meter will turn off.

Three status indicators (in the form of LEDs) provide the following information:

Charge—Whenever the state of the battery's charge is ascertained as being less than a predetermined level and a charging connection is made to an external supply, the meter automatically enters a charge cycle and the appropriate LED illuminates.

Action required—This indicator LED has two illuminated states and one off state. The actual logical states of the control software and the utilisation of this indicator will depend upon the meter configuration.

In use, however, this indicator will indicate:

(i) warnings of a state that will require some action at some time before a milk sample can be dispensed;

(ii) warnings of a state that requires action now.

The intent in having these two levels of warning is to avoid unnecessarily imposing effort on the operator.

End of milking—This indicator LED will have two illuminated states and one off state.

In use, this indicator will indicate:

(i) a normal End of Milking state in which all requirements have been met and during which a normal sample will be dispensed;

(ii) an abnormal End of Milking state in which the meter requires some further input from the operator.

Accordingly, the milk meter will accept (when the Select Meter input is activated), and perform in accordance with, only the following valid commands:

(i) Input animal identification from the remote control.
(ii) Change an animal identification that has already been entered.
(iii) Finished.
(iv) Wash
(v) Turn meter off.
(vi) Output status to the remote control
  (a) Meter serial number.
  (b) No error state in the meter then return
    animal identification
    milk yield
    milk flow rate.
  (c) Pending error state in the meter then return data.
  (d) Necessary error state in the meter then return error status and no data:
    no animal identification
    no vial
    no valid identification
    low battery charge/voltage
    no valid sample-state signal on probes
  (e) Other status information
    battery not acquiring sufficient voltage in a predetermined time
    on-farm usage, by farm identification number
(vii) Send stored battery state to the remote control.
(viii) Send all data for a specific set of dates to the remote control to reconstitute a lost herd test file.
(ix) Calibration and factory acceptance tests.

Commands (i), (ii), (iii), (iv), (v), (vi) (a), (vi) (b), (vi) (c) and (vi) (d) will be available to any user. Commands (vi) (e), (vii) and (viii) will only be available to authorised personnel of the testing authority or body. These commands can be exercised with some manner of hidden key operations.

Command (ix) will only be available to the manufacturer.

Database Contents and Retention

Each milk meter will keep a record of all data that it has created for at least three test milking sessions. In the event of a remote control being lost or damaged it is possible to regenerate a complete test record from the records of the separate milk meters.

The data retained comprises:
(i) Farm identification.
(ii) Herd identification.
(iii) Mob identification.
(iv) Animal identification.
(v) Sample vial identification.
(vi) Start of milking time (the time at which milk flow met Start of Milking criteria).
(vii) End of milking time (the time at which milk flow met End of Milking criteria, or the time at which the End of Milking input was activated).
(viii) Timing error status (differences between meter time or date and remote control time or date).
(ix) Total milking time for each testing session.
(x) Action required state (Pending, Necessary, Completed, and Clear).
(xi) Milking state (Animal milking, Possible End of milking, Definite End of milking).
(xii) Animal termination condition(s).
(xiii) Transmission error status.
(xiv) Battery charge condition (stored battery state).
(xv) New animals into the milking herd.
(xvi) Old animals removed from the milking herd.
(xvii) A list of all other meters present at any particular milking session, the data in this list being collected automatically by the remote control and passed to each meter present at the milking session (the data in this list will be used to regenerate data that has been lost through loss of or damage to another remote control).

As mentioned previously, the remote control is provided with a keypad and a typical layout is shown in the accompanying drawing. This keypad includes a mechanical on/off key, three control keys (STATE; ANIMAL; TEST), ten digit keys (0–9) and a scroll key. Each key can have up to three colour-coded actions; the actual, current, one being determined by the preceding control key.

It is the intention of the preferred form of the invention that any particular farmer/user who will only be using the remote control perhaps 3–5 times per year and may have little on-going familiarity with the product will find the remote control to be straight forward in use.

Keypad Description

ON/OFF—will mechanically power up the remote control and under software control power down the remote control.

Should the remote control be OFF, then activation of this key will turn it on. Upon turning on, the remote control will:
  Check for an external data connection.
  Check for an external battery charger connection and if present the remote control will then automatically enter a charging sequence.
  Check the state of the internal battery and report should there be insufficient energy remaining to successfully complete any likely test session.
  Check the amount of memory used and report should there be insufficient remaining to successfully complete any likely test session.
  Compare the time and date with that when the remote control was last turned off and determine whether the previous session was successfully and properly completed and terminated.
  Check whether all meters were successfully turned off before the remote control was last turned off.

Should the remote control be ON then activation of this key will turn it off. Before turning off, the remote control will:
  Check for any meters being still on. Should any meters still be on then the remote control will not permit a turn off sequence.
  Check whether all animals (as recorded in the farm database) have been milked or otherwise accounted for. Should there be any animals not accounted for, then the remote control can, at the minimum, warn the operator.
  Check whether all meters have been washed. Should there be any meters that have not been washed then the remote control will, at the minimum, warn the operator.
  Check that all relevant data has been down-loaded from the remote control to each meter. Should there be any meters with databases that have not been completely updated then the remote control will, at the minimum, warn the operator.
  Check that all relevant data has been up-loaded from each meter to the remote control. Should there be any meters whose databases have not been completely up-loaded, then the remote control will, at the minimum, warn the operator.

ANIMAL—This key under software control indicates to the remote control that the contiguously following presses of any digit keys are to be interpreted as an animal identification number.

When the ANIMAL key is pressed, the remote control will:
  If not in an active ANIMAL state, terminate any existing STATE or TEST state and sound an alarm.

Display STATE=FINISHED, or display STATE=WASH, or display STATE=METER OFF, if STATE is set to the respective state. No animal identification input will be allowed, or alternatively no animal identification data will be transmitted to any meter and no animal identification data will be recorded to the remote control database if STATE is set to any of these states.

Display ANIMAL.

Expect a series of digits (possibly 1 up to 4 in number) to be entered as an animal identification number.

Time out from an active ANIMAL state, clear the display, set the current animal identification number to null, and sound an alarm, if no key is pressed for a predetermined period (say, 5 seconds).

Set current animal identification number to null, display the respective message, and sound an alarm, if in an active ANIMAL state, and no digit or series of digits is entered, and the STATE, or TEST, or ∀ key is pressed.

Display ANIMAL=n/nn/nnn/nnnn (as applicable) if in an active ANIMAL state, as and if, a new animal identification number is entered; and set the current animal identification number to the digit or series of digits if the STATE, or TEST, or ∀ key is pressed.

Display ANIMAL=n/nn/nnn/nnnn (as applicable) if in an active ANIMAL state, as and if, a new animal identification number is entered; and set the current animal identification number to null, and display ANIMAL=NONE if the ANIMAL key is pressed again.

Display DUPLICATE ID, and sound an alarm, if in an active ANIMAL state, and if an animal identification number that has already been entered (and processed) is re-entered and the Select Meter is subsequently activated on any meter.

Display ANIMAL=n/nn/nnn/nnnn (as applicable) as and if a new animal identification number is entered; and set the new animal identification number to the digit or series of digits if the STATE, or TEST, or ∀ key is pressed.

Display DUPLICATE ID, and sound an alarm, if in an active ANIMAL state, and if an animal identification number that has already been entered (and processed) is re-entered and the ANIMAL key is pressed again.

Display ANIMAL=n/nn/nnn/nnnn (as applicable) as and if an animal identification number is entered; change the new animal identification number.

Display DUPLICATE ID, and sound an alarm, if in an active ANIMAL state, and if an animal identification number that has already been entered (and processed) is re-entered and the ∀, STATE, or TEST key is (subsequently) pressed.

Display the animal identification data for the animal whose identification number has already been entered previously if the ∀ key is pressed, and edit this earlier information if any of the applicable digit keys is pressed. Pressing the TEST or STATE key will terminate the animal identification edit process and put the remote control into the respective edit mode. Pressing the ∀ key once will put the remote control into the STATE edit mode, pressing the ∀ key again will put the remote control into the TEST edit mode, pressing the ∀ key a third time will end the edit mode. Pressing the ANIMAL key will be ignored. Time out from the edit process, and sound an alarm, if no key is pressed for a predetermined period (say, 5 seconds).

Display the state data for the animal whose identification number has already been entered previously if the STATE key is pressed, and edit this earlier information if any of the applicable digit keys is pressed. Only one state will be recordable against an animal. Pressing the TEST, ANIMAL, or ∀ key will terminate the edit process and return the remote control to an inactive ANIMAL state, pressing the STATE key will be ignored. Time out from the edit process, and sound an alarm, if no key is pressed for a predetermined period (say, 5 seconds).

Display the test data for the animal whose identification number has already been entered previously if the TEST key is pressed. More than one test can be recorded against an animal. The test data shall be able to be examined in turn by pressing the ∀ key. Pressing any applicable digit key will edit the test data currently displayed. Pressing the ∀ key passed the end of the existing test list will terminate the edit process and return the remote control to an inactive ANIMAL state. Pressing the STATE, or ANIMAL key will terminate the edit process and return the remote control to an inactive ANIMAL state. Pressing the EDIT key will be ignored. Time out from the edit process, and sound an alarm, if no key is pressed for a predetermined period (say, 5 seconds).

Leave the ANIMAL state, and sound an alarm, when either the STATE or the TEST key is pressed.

If an animal identification number is entered that is not one as loaded by the testing authority/body then the remote control shall display NEW? RE-ENTER. If the same animal identification is re-entered then the remote control will accept this new animal identification number and add it to the list of known/valid animal identification numbers and flag to the database that a new animal has entered the herd.

If a duplicate animal identification has resulted in an earlier animal's record being edited, and if the corresponding milk meter has not had its database updated, and if the current data and meter control record includes a STATE=METER OFF state, then the remote control might display SELECT METER nnn where nnn is the position of the meter which has to have its internal database updated.

STATE—This key under software control indicates to the remote control that the single (or last) following press of any digit key is to be interpreted as an animal sample abnormality code.

When the STATE key is pressed, the remote control will:

Display STATE=NONE if there is no sample or meter-control state recorded in the pending (if an animal identification has not been input), or current (if an animal identification has been input), data and control record.

Display STATE=state if a sample or meter-control state has been recorded in the pending (if an animal identification has not been input), or current (if an animal identification has been input), data and control record.

Expect a digit key (e.g. 1–4) to be pressed as a sample or meter-control state entry.

Time out from an active STATE state, clear the display, leave the current state as it was, and sound an alarm, if no key is pressed for a predetermined period (say 5 seconds).

Display STATE=

| | | |
|---|---|---|
| Case | 0 | blank no change to existing state |
| | 1 | MISSED |
| | 2 | LOST |
| | 3 | IN SEASON |
| | 4 | HELD MILK |
| | 5 | WITH CALF |
| | 6 | SICK |
| | 7 | FINISHED |
| | 8 | WASH |
| | 9 | METER OFF |

(as applicable) if in an active STATE state, as and if, a new digit is entered; and set the current sample or meter-control state to the digit.

Pressing the TEST or STATE key will terminate the sample or meter-control state edit process and put the remote control into the respective edit mode. Pressing the ✓ key once will put the remote control into the ANIMAL edit mode. Pressing the ✓ key again will put the remote control into the TEST edit mode. Pressing the ✓ key a third time will again put the remote control into the STATE edit mode. Successive presses of the ✓ key will cycle the remote control through this sequence. The current STATE state will be left as it was, time out from the STATE edit process, and sound an alarm, if no key is pressed for a predetermined period (say, 5 seconds).

If a FINISHED state is entered, then the remote control will sequentially display as requested the identification number of each animal as in loaded by the testing authority/body as being milked, but which has not been entered as an animal identification number. The sequential display will be requested and managed with the ✓ key. For each animal identification number that is displayed a STATE state will be entered. If all animals are given a STATE state, then the FINISHED state will be allowed (automatically) and if a Select Meter input is subsequently activated on any meter then the FINISHED state will be transmitted to it. If not all animals are given a STATE state, then the FINISHED state will not be allowed and if a Select Meter input is subsequently activated on any meter then the FINISHED state will not be transmitted to TEST—This key under software control indicates to the remote control that the single (or last) following press of any digit key is to be interpreted as an animal sample test code.

When the TEST key is pressed, the remote control will:
Display TEST=NONE if there is no sample test state recorded in the pending (if an animal identification has not been input), or current (if an animal identification has been input), data and control record.

Display STATE=FINISHED, or display STATE=WASH, or display STATE=METER OFF, if STATE is set to the respective state. No test state will be allowed, or alternatively no test state will be transmitted to any meter and no test state will be recorded to the remote control database if STATE is set to any of these states.

Display TEST=test if a sample test state has been recorded in the pending (if an animal identification has not been input), or current (if an animal identification has been input), data and control record.

Expect a digit key (0–9) to be pressed as a sample test state entry.

Time out from an active TEST state, clear the display, leave the current state as it was, and sound an alarm, if no key is pressed for a predetermined period (say, 5 seconds).

Display TEST=

| | | |
|---|---|---|
| Case | 3 | EBL |
| | 4 | LACTOSE |
| | 9 | SCC ONLY |

(as applicable) if in an active STATE state, as and if, a new digit is entered; and set the current sample test state to the digit.

Pressing the ANIMAL, or STATE key will terminate the sample test state edit process and put the remote control into the respective edit mode. Pressing the ✓ key once will put the remote control into the ANIMAL edit mode. Pressing the ✓ key again will put the remote control into the STATE edit mode. Pressing the ✓ key a third time will again put the remote control into the TEST edit mode. Successive presses of the ✓ key will cycle the remote control through this sequence. The current TEST state will be left as it was. Time out from the TEST edit process, and sound an alarm, if no key is pressed for a predetermined period (say, 5 seconds).

Generally, animal identification, sample or meter-control and test, states and data, will be set to null when a record is successfully sent to a meter following a Select Meter input activation. The exceptions are when data and meter-control records contain:

| | |
|---|---|
| STATE = | FINISHED |
| | WASH |
| | METER OFF |

Sample or meter-control states will not be set to null in these cases.

Meter and remote control databases will be updated when a record is successfully sent to a meter following a Select Meter input activation.

In some implementations the TEST key may not be included.

Data and Meter-Control Record Contents

A data and meter-control record may exist in one of two states:

Pending because:

| | |
|---|---|
| STATE = | MISSED |
| | LOST |
| | IN SEASON |
| | HELD MILK |
| | WITH CALF |
| | SICK | and

No valid animal identification has been entered or

Current because:

| | |
|---|---|
| STATE = | FINISHED |
| | WASH |
| | METER OFF |
| or | |
| STATE = | MISSED |
| | LOST |

-continued

|                |
|----------------|
| IN SEASON      |
| HELD MILK      |
| WITH CALF      |
| SICK           | and

A valid animal identification has been entered.

Pending data and meter-control records will not be sent to any meter when its Meter Select input is activated, and therefore pending data and meter-control records will not be recorded to the remote control database.

Current data and meter-control records will be sent to any meter when its Meter Select input is activated, thereby current data and meter-control records will be recorded to the remote control database.

The invention is open to modification as will be appreciated by those skilled in the art.

For example, in one modified arrangement, the system can be arranged so that for only specific animals during the testing session will a vial sample be taken. For all other animals, the representative sample will at the end of milking be dumped directly into the milk line.

Such a modified system can be useful when somatic cell count tests are being carried out and as a result of which the farmer will generally know the animals for which a test is particularly required. With the present invention, the farmer would set the remote control to indicate that it was a somatic cell count test (i.e. TEST SCC). Thus, if a TEST SCC sequence is entered before the End of Milking input is activated, a sample will be dispensed in the normal way (milk, stir, sample, drain). If the TEST SCC only sequence is not entered then the milk meter will go straight from milking to a drain position and thereby drain the representative sample directly into the milk line. This provides the advantage that milk only enters the vial for the animal for which a test is required which is an improvement over previous procedures where a vial would be filled each time but with the vial being emptied after each milking until the vial was filled with milk from an animal for which testing was required. With the present invention, the vial is only ever filled once and this reduces the possibility of cross-contamination which might be important in Enzootic Bovine Leucosis and other future and sensitive tests.

The present invention thus provides a remote control which when used with milk meters in a milking shed provides an effective, efficient and reliable means of collecting data for ongoing analysis.

What is claimed is:

1. An animal milk production data recording means, the data recording means comprising a portable remote control device constructed and arranged to accept and store animal related data, recording means adapted to be associated with each of a plurality of animal milking means, wireless transmission means to facilitate at least transfer of information related to an animal being or having been milked from the recording means to the portable remote control device, said portable remote control device including a software program operable to use the information to update a record in the portable remote control device relevant to the animal to which the information relates.

2. Data recording means as claimed in claim 1 further including display means for the display of data.

3. Data recording means as claimed in claim 1 or 2 wherein the recording means is a milk meter.

4. The device of claim 3 wherein each milk meter includes computer controlled means of dispensing a representation milk sample into a vial for each animal milked at a milking station with which the milk meter is associated.

5. The device of claim 4 wherein each milk meter includes means to read identification indicia of each vial and correlate the identification indicia to an animal identification of an animal to which a sample placed in the vial relates.

6. Data recording means as claimed in claim 1 further including a keypad for inputting data/control information.

7. Data recording means as claimed in claim 1 wherein the portable remote control device includes an on-board power source.

8. Data recording means as claimed in claim 1 wherein communication between the portable remote control device and the recording means is by radio frequency communication means.

* * * * *